(12) United States Patent
Kim

(10) Patent No.: US 6,894,257 B2
(45) Date of Patent: May 17, 2005

(54) MICROWAVE OVEN

(75) Inventor: Hyang-Ki Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/443,819

(22) Filed: May 23, 2003

(65) Prior Publication Data

US 2004/0118836 A1 Jun. 24, 2004

(30) Foreign Application Priority Data

Dec. 23, 2002 (KR) ................................. 10-2002-0082712

(51) Int. Cl.[7] .............................. H05B 6/80; H05B 6/64
(52) U.S. Cl. ...................... 219/682; 219/757; 219/401
(58) Field of Search ............................. 219/682, 757, 219/401, 400, 440, 701, 705, 710, 731, 756, 772, 679, 686, 684, 685; 126/21 A, 20, 21 R

(56) References Cited

U.S. PATENT DOCUMENTS 4,449,026 A * 5/1984 Satoh ......................... 219/682
4,454,404 A * 6/1984 Zushi ......................... 219/682
6,133,558 A * 10/2000 Ueda et al. .................. 219/682
6,730,895 B2 * 5/2004 Kim ........................... 219/682

FOREIGN PATENT DOCUMENTS

JP       53024147 A  *  3/1978   ............ H05B/9/06
JP       55000812 A  *  1/1980   ............ F24C/13/00

OTHER PUBLICATIONS

Yasumichi et al., Cooker, Pub. Date Dec. 26, 2001, Patent Abstract of Japan, Pub. No. 2001–355843.
Verified Translation of the Priority Document (Korean Application No. 2002–82712).

* cited by examiner

*Primary Examiner*—Quang T. Van
(74) *Attorney, Agent, or Firm*—Staas & Halsey LLP

(57) ABSTRACT

A microwave oven includes a cabinet which defines an appearance of the microwave oven, a cooking cavity which is provided in the cabinet, a steam generating unit which is provided at a predetermined portion of the cabinet, and a steaming unit which is provided in the cabinet so as to define a space separated from the cooking cavity. The microwave oven further includes a steam guide passage which is provided in the cabinet to guide steam generated from the steam generating unit into the steaming unit.

22 Claims, 2 Drawing Sheets

MICROWAVE OVEN

CROSS-REFERENCE TO RELATED APPLICATIONS

This application claims the benefit of Korean Application No. 2002-82712, filed Dec. 23, 2002, in the Korean Intellectual Property Office, the disclosure of which is incorporated herein by reference.

BACKGROUND OF THE INVENTION

1. Field of the Invention

The present invention relates to microwave ovens, and more particularly, to a microwave oven which steam cooks food using steam.

2. Description of the Related Art

Generally, a microwave oven is an appliance which cooks food laid in its cooking cavity by irradiating microwaves generated from a magnetron into the cooking cavity. Compared to an electric heater which cooks food by heating surfaces of the food, the microwave oven cooks the food by heating an interior of the food through a dielectric heating method. That is, the microwaves irradiated from the magnetron of the microwave oven cause molecules of moisture laden in the food to vibrate, thereby generating a frictional heat within the food to cook the food.

However, where food is cooked by such a conventional microwave oven, the taste and appearance of the food are deteriorated as the frictional heat generated from the microwaves to cook the food removes the moisture laden in the food. Furthermore, the conventional microwave oven is problematic in that it is difficult to steam cook food to which water must be added during a cooking. Thus, although the microwave oven is widely used to cook food, a separate steaming apparatus is additionally required to steam cook food, thus causing an inconvenience to a user.

SUMMARY OF THE INVENTION

Accordingly, it is an aspect of the present invention to provide a microwave oven which is provided with a steam generating unit and a steaming unit, so as to steam cook food.

Additional aspects and advantages of the invention will be set forth in part in the description which follows and, in part, will be obvious from the description, or may be learned by practice of the invention.

To achieve the above and/or other aspects of the present invention, there is provided a microwave oven comprising a cabinet which defines an appearance of the microwave oven, a cooking cavity which is provided in the cabinet, a steam generating unit which is provided at a predetermined portion of the cabinet, a steaming unit which is provided in the cabinet so as to define a space separated from the cooking cavity, and a steam guide passage which is provided in the cabinet to guide steam from the steam generating unit into the steaming unit.

The steam generating unit may include a steam container which is removably installed in the cabinet and provided on a top thereof with an opening which communicates with the steam guide passage, a heater which is installed in the steam container, and a power supply connecting unit which is provided between the steam container and the cabinet to connect the heater to a power supply of the microwave oven where the steam container is installed in the cabinet.

The steam generating unit may further include a steam container receiving recess having a predetermined depth, which is formed on a sidewall of the cabinet and receives the steam container. The steam container receiving recess may include an opening which is formed on a top of the steam container receiving recess and communicates with the steam guide passage. The power supply connecting unit may include first and second connecting parts which are provided on an outer surface of the steam container and an inner surface of the steam container receiving recess, respectively, so as to connect or disconnect the first connecting part to or from the second connecting part where the steam container is installed in or removed from the cabinet.

The steaming unit may include a steaming depression having a predetermined depth, which is formed on an upper portion of the cabinet, communicates with the steam guide passage, and receives food to be cooked, and a cover which covers an open top of the steaming depression.

The steaming unit may further include a cooking vessel to contain food therein, which is removably installed in the steaming depression and includes a hole provided on the cooking vessel to communicate with the steam guide passage, and a food supporting plate which is removably installed in the cooking vessel so as to be spaced apart from a bottom of the cooking vessel, supports the food thereon, and allows steam to circulate therethrough.

The hole of the cooking vessel, which communicates with the steam guide passage, may be provided at a sidewall of the cooking vessel to be higher than the bottom of the cooking vessel.

The cabinet may include a control panel which controls an operation of the microwave oven, and a control part which is provided on the control panel to separately control the steam generating unit.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
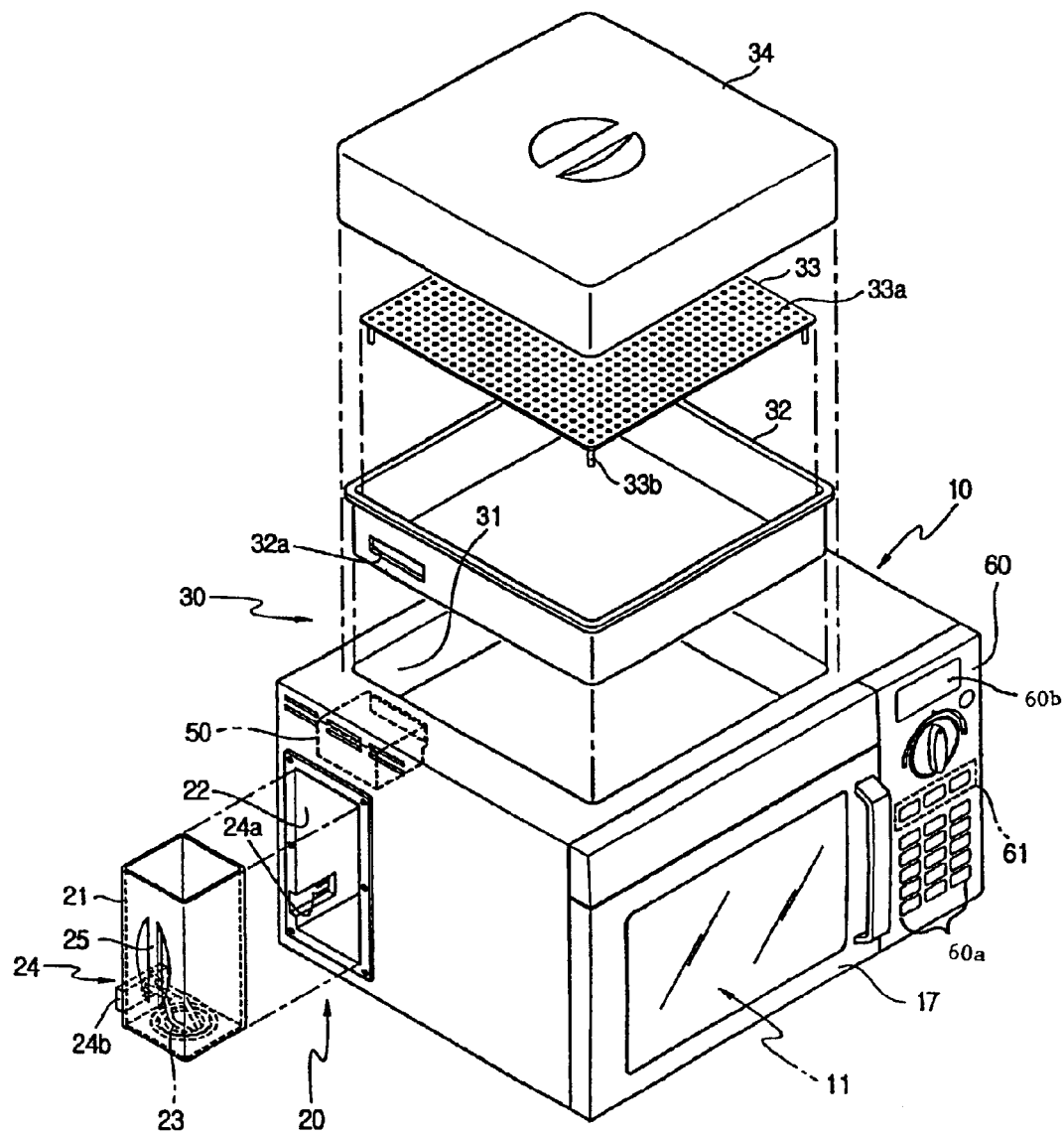
FIG. 1 is an exploded perspective view of a microwave oven according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
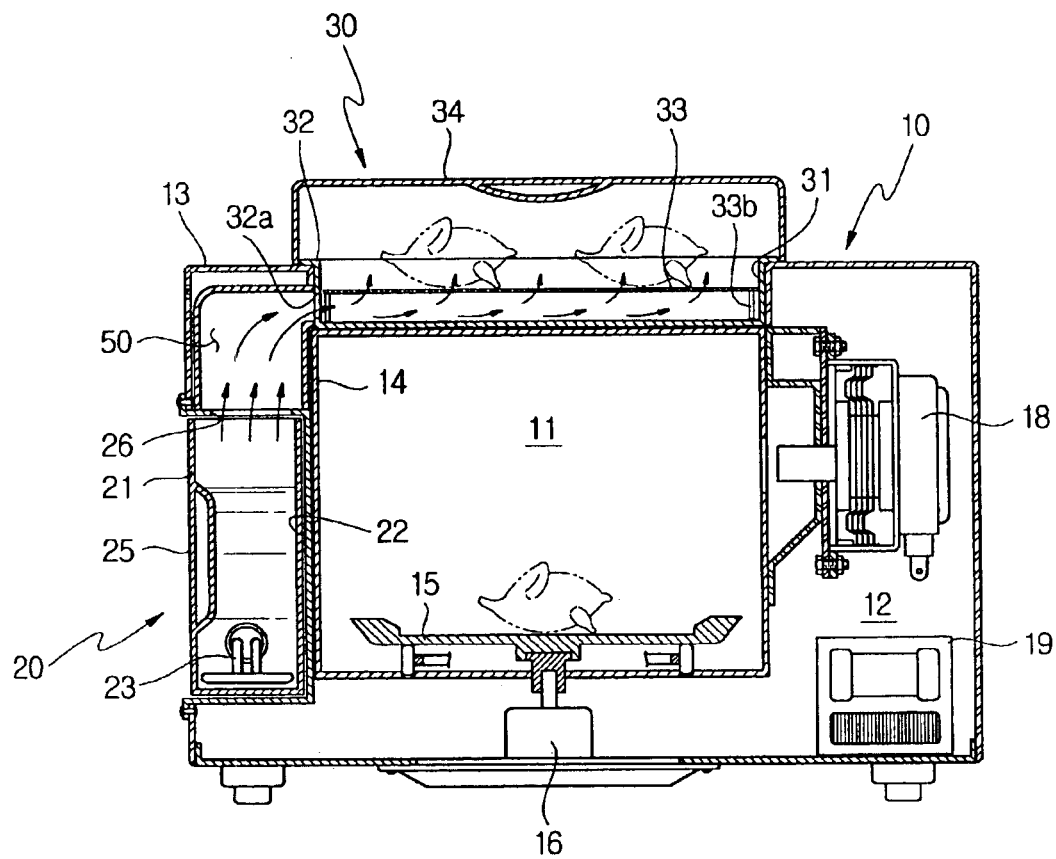
FIG. 2 is a sectional view of the microwave oven shown in FIG. 1.

FIGS. 1 and 2 show a microwave oven according to an embodiment of the present invention. The microwave oven includes a cabinet 10 which is partitioned into a cooking cavity 11 and a machine room 12. Food to be cooked is laid in the cooking cavity 11. An inner casing 14 of the cabinet 10 is provided inside an outer casing 13 of the cabinet 10, and defines the cooking cavity 11. The inner casing 14 partitions the cabinet 10 into the cooking cavity 11 and the machine room 12.

A cooking tray 15 is rotatably mounted to a bottom of the cooking cavity 11. Food to be cooked is laid on the cooking tray 15 inside the cooking cavity 11. A motor 16 is installed in a space between the bottom of the cooking cavity 11 and a bottom of the outer casing 13 under the cooking cavity 11 to rotate the cooking tray 15. A door (not shown) is mounted to a front of the cooking cavity 11 to open or close the cooking cavity 11. The machine room 12 includes a magnetron 18 and a high-voltage transformer 19. The magnetron 18 irradiates microwaves into the cooking cavity 11, and the high-voltage transformer 19 applies high voltage to the magnetron 18. Such a construction allows food laid on the cooking tray 15 provided in the cooking cavity 11 to be cooked using the microwaves irradiated from the magnetron 18.

Additionally, the microwave oven according to the present invention allows food to be cooked using steam. The microwave oven further includes a steam generating unit 20 and a steaming unit 30. In this case, the steam generating unit 20 is installed in the cabinet 10. The steaming unit 30 functions to cook food using steam generated by the steam generating unit 20. Here, the steaming unit 30 is mounted to an upper portion of the cabinet 10, and is connected to the steam generating unit 20 via a steam guide passage 50 having a duct shape.

The steam generating unit 20 includes a steam container 21 and a steam container receiving recess 22. The steam container 21 has a rectangular cross-section which is opened at a top. The steam container receiving recess 22 is formed on a sidewall of the cabinet 10 and has a dimension corresponding to the steam container 21, so as to removably receive the steam container 21. The steam generating unit 20 further includes a heater 23 and a power supply connecting unit 24. The heater 23 is installed in the steam container 21, and heats water contained in the steam container 21 to generate steam. The power supply connecting unit 24 functions to connect the heater 23 to a power supply (not shown) where the steam container 21 is installed in the steam container receiving recess 24.

The power supply connecting unit 24 includes a first connecting part 24a and a second connecting part 24b. The first connecting part 24a is provided on an inner surface of the steam container receiving recess 22, and the second connecting part 24b is provided on an outer surface of the steam container 21 at a position corresponding to the first connecting part 24a.

A handle 25 is provided on an outer surface of the steam container 21 to allow the steam container 21 to be easily removed or installed with respect to the steam container receiving recess 22. As illustrated in FIG. 2, an opening 26 is formed on a top of the steam container receiving recess 22 so as to allow the steam to flow from the steam container 21 into the steam guide passage 50.

The steaming unit 30 provided in the upper portion of the cabinet 10 includes a steaming depression 31, a cooking vessel 32, a food supporting plate 33, and a cover 34. The steaming depression 31 is formed on the upper portion of the cabinet 10 to have a predetermined depth, and communicates with the steam guide passage 50. The cooking vessel 32 receives food therein, and is removably installed in the steaming depression 31. The food supporting plate 33 is installed in the cooking vessel 32. The cover 34 covers an open top of the cooking vessel 32.

Here, the cooking vessel 32 has a rectangular cross-section which is opened at the top. A hole 32a is provided at a sidewall of the cooking vessel 32 to communicate with the steam guide passage 50. In this case, the hole 32a provided at the sidewall of the cooking vessel 32 is positioned to be higher than a bottom of the cooking vessel 32. Accordingly, water and/or oil collected in the cooking vessel 32 during a cooking operation are prevented from flowing into the steam guide passage 50. The food supporting plate 33 is provided with a plurality of perforations 33a which allow steam to pass therethrough, and a plurality of support legs 33b which space the food supporting plate 33 apart from the bottom of the cooking vessel 32.

Although the steam generating unit 20 and the steaming unit 30 have been shown with a rectangular cross-section, it is understood that these units may be provided with different shapes. Furthermore, the location of the units may be changed without departing from the principles and spirit of the invention.

As illustrated in FIG. 1, the microwave oven further includes a control panel 60. The control panel 60 is mounted to a front of the machine room 12, and is provided with a plurality of control buttons 60a to control an operation of the microwave oven, and a display 60b to display an operating state of the microwave oven. To separately control an operation of the heater 23 installed in the steam generating unit 20, heater control buttons 61 are provided in the control panel 60.

Operations of the microwave oven are described hereinbelow with reference to FIGS. 1 and 2.

Where one desires to cook food through a microwave heating method, the food is laid on the cooking tray 15 provided in the cooking cavity 11, and the microwave oven is operated. At this time, microwaves are irradiated from the magnetron 18 into the cooking cavity 11 to cook the food.

Where one desires to steam food using the steaming unit 30, the food is laid on the food supporting plate 33 provided in the cooking vessel 32, and the open top of the cooking vessel 32 is closed by the cover 34. A predetermined amount of water is fed into the steam container 21 of the steam generating unit 20, and the steam container 21 is installed in the steam container receiving recess 22. At this time, power is supplied to the heater 23 installed in the steam container 21 through the power supply connecting unit 24. Where the heater 23 is operated by a manipulation of the control buttons 61 of the control panel 60 in such a state, water contained in the steam container 21 is heated, thus generating steam. The steam flows into the steaming unit 30 through the opening 26, formed on the top of the steam container receiving recess 22, and the steam guide passage 50. Thus, the food laid in the cooking vessel 32 is cooked using the steam. At this time, oil or water, which is produced from the food and drips from the food, is collected in the cooking vessel 32. However, the hole 32a of the cooking vessel 32 communicating with the steam guide passage 50 is provided at a position higher than the bottom of the cooking vessel 32. Therefore, the oil or water is prevented from flowing into the steam guide passage 50. To remove the oil or water from the cooking vessel 32, a user may remove the cooking vessel 32 from the cabinet 10 after a steam cooking operation is completed.

Where power is simultaneously applied to both the magnetron 18 and the heater 23 of the steam container 21 by controlling the control panel 60, one food item may be cooked through a microwave heating method while another food item may be cooked using steam. Since the steam container 21 is easily removed from the cabinet 10, the steam container 21 may be used to heat or boil water for other applications, for example, boiling water to prepare hot tea or coffee.

As described above, the present invention provides a microwave oven which is provided with a steam generating unit and a steaming unit, so as to steam cook food.

Accordingly, with the present invention, food may be steam cooked or cooked through microwave heating method. Also, separate food items may be simultaneously cooked through different cooking methods. With utilization of the steaming generating unit, a steam container of the steam generating unit may also be used to heat or boil water.

Although a few preferred embodiments of the present invention have been shown and described, it would be appreciated by those skilled in the art that changes may be made in these embodiments without departing from the principles and spirit of the invention, the scope of which is defined in the appended claims and their equivalents.

What is claimed is:

1. A microwave oven comprising:
    a cabinet which defines an appearance of the microwave oven;
    a cooking cavity which is provided in the cabinet;
    a steam generating unit which is provided at a predetermined portion of the cabinet;
    a steaming unit which is provided in the cabinet so as to define a space separated from the cooking cavity; and
    a steam guide passage which is provided in the cabinet to guide steam from the steam generating unit into the steaming unit,
    wherein the microwave oven selectively simultaneously cooks food in the steaming unit and the cooking cavity.

2. The microwave oven according to claim 1, wherein the steam generating unit comprises:
    a steam container which is removably installed in the cabinet, and provided on a top thereof with an opening which communicates with the steam guide passage;
    a heater which is installed in the steam container; and
    a power supply connecting unit which is provided between the steam container and the cabinet to connect the heater to a power supply of the microwave oven where the steam container is installed in the cabinet.

3. The microwave oven according to claim 2, wherein:
    the steam generating unit further comprises a steam container receiving recess having a predetermined depth, which is formed on a sidewall of the cabinet and receives the steam container,
    the steam container receiving recess includes an opening which is formed on a top of the steam container receiving recess and communicates with the steam guide passage, and
    the power supply connecting unit comprises first and second connecting parts which are provided on an outer surface of the steam container and an inner surface of the steam container receiving recess, respectively, so as to connect or disconnect the first connecting part to or from the second connecting part where the steam container is installed in or removed from the cabinet.

4. The microwave oven according to claim 3, wherein the steaming unit comprises:
    a steaming depression having a predetermined depth, which is formed on an upper portion of the cabinet, communicates with the steam guide passage, and receives food to be cooked; and
    a cover which covers an open top of the steaming depression.

5. The microwave oven according to claim 4, wherein the steaming unit further comprises:
    a cooking vessel to contain the food therein, which is removably installed in the steaming depression and includes a hole provided in the cooking vessel to communicate with the steam guide passage; and
    a food supporting plate which is removably installed in the cooking vessel so as to be spaced apart from a bottom of the cooking vessel, supports the food thereon, and allows steam to circulate therethrough.

6. The microwave oven according to claim 5, wherein the hole of the cooking vessel, which communicates with the steam guide passage, is provided at a sidewall of the cooking vessel to be higher than the bottom of the cooking vessel.

7. The microwave oven according to claim 2, wherein the heater heats water or a solution contained in the steam container.

8. The microwave oven according to claim 1, wherein the cabinet includes a control panel which controls an operation of the microwave oven, and a control part which is provided on the control panel to separately control the steam generating unit.

9. The microwave oven according to claim 1, wherein the steaming unit comprises:
    a steaming depression having a predetermined depth, which is formed on an upper portion of the cabinet, communicates with the steam guide passage, and receives food to be cooked; and
    a cover which covers an open top of the steaming depression.

10. The microwave oven according to claim 9, wherein the steaming unit further comprises:
    a cooking vessel to contain the food therein, which is removably installed in the steaming depression and includes a hole provided on the cooking vessel to communicate with the steam guide passage; and
    a food supporting plate which is removably installed in the cooking vessel so as to be spaced apart from a bottom of the cooking vessel, supports the food thereon, and allows steam to circulate therethrough.

11. The microwave oven according to claim 10, wherein the hole of the cooking vessel, which communicates with the steam guide passage, is provided at a sidewall of the cooking vessel to be higher than the bottom of the cooking vessel.

12. The microwave oven according to claim 10, wherein the food support plate includes perforations which circulate the steam therethrough and one or more support legs which space apart the food supporting plate from the bottom of the cooking vessel.

13. The microwave oven according to claim 1, wherein the steaming unit is removably provided at the cabinet.

14. The microwave oven according to claim 1, further comprising a magnetron which generates microwaves to cook food placed in the cooking cavity.

15. The microwave oven according to claim 14, wherein the microwave oven performs a microwave cooking operation of food in the cooking cavity and a steam cooking operation of food in the steaming unit, separately or simultaneously.

16. A microwave oven comprising:
    a cabinet which defines an appearance of the microwave oven;
    a cooking cavity which is provided in the cabinet;
    a heating unit which is provided in the cabinet; and
    a steaming unit which is provided to the cabinet so as to define a space separated from the cooking cavity,
    wherein the microwave oven performs a microwave cooking operation of food in the cooking cavity and a steam cooking operation of food in the steaming unit, using the heating unit.

17. The microwave oven according to claim 16, wherein the heating unit includes:
- a magnetron which generates microwaves to cook the food placed in the cooking cavity; and
- a steam generating unit which generates steam to steam cook the food placed in the steaming unit.

18. The microwave oven according to claim 17, further comprising a steam guide passage which is provided in the cabinet to guide the steam from the steam generating unit to the steaming unit.

19. A microwave oven, comprising:
- a cabinet;
- a microwave cooking cavity provided in an interior of the cabinet;
- a steaming unit removably provided in an exterior of the cabinet; and
- a steam generating unit provided in the cabinet and providing steam to the steaming unit.

20. A microwave oven, comprising:
- a cabinet with a steaming depression in an exterior of the cabinet;
- a microwave cooking cavity provided in the cabinet;
- a steaming unit removably seated in the steaming depression; and
- a steam generating unit provided in the cabinet and providing steam to the steaming unit.

21. A microwave oven, comprising:
- a cabinet;
- a microwave cooking cavity provided in the cabinet performing a microwave cooking operation; and
- a steaming unit removably provided in the cabinet separate from the microwave cooking cavity and performing a steam cooking operation, the microwave and steam cooking operations being separately and simultaneously performable.

22. A microwave oven, comprising:
- a microwave cooking cavity to cook food using microwaves; and
- a steaming unit provided separate from the microwave cooking cavity, to cook food using steam, the microwave cooking cavity and the steaming unit being simultaneously operable.

* * * * *

UNITED STATES PATENT AND TRADEMARK OFFICE
CERTIFICATE OF CORRECTION

PATENT NO. : 6,894,257 B2
DATED : May 17, 2005
INVENTOR(S) : Hyang-Ki Kim

It is certified that error appears in the above-identified patent and that said Letters Patent is hereby corrected as shown below:

<u>Column 6,</u>
Line 63, after "oven" insert -- selectively simultaneously --.

Signed and Sealed this

Seventh Day of March, 2006

JON W. DUDAS
*Director of the United States Patent and Trademark Office*